United States Patent
Wey et al.

(10) Patent No.: US 9,188,955 B2
(45) Date of Patent: Nov. 17, 2015

(54) METHOD AND APPARATUS FOR FAST GENERATION OF THREE-DIMENSIONAL (3D) HOLOGRAM

(75) Inventors: Ho Cheon Wey, Seoul (KR); Dong Kyung Nam, Yongin-si (KR); Seok Lee, Hwaseong-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 492 days.

(21) Appl. No.: 13/588,497

(22) Filed: Aug. 17, 2012

(65) Prior Publication Data

US 2013/0107336 A1 May 2, 2013

(30) Foreign Application Priority Data

Oct. 28, 2011 (KR) .................. 10-2011-0110993

(51) Int. Cl.
*G03H 1/08* (2006.01)
*G03H 1/22* (2006.01)

(52) U.S. Cl.
CPC ..... *G03H 1/0808* (2013.01); *G03H 2001/0833* (2013.01); *G03H 2001/2297* (2013.01); *G03H 2210/30* (2013.01); *G03H 2210/452* (2013.01); *G03H 2210/454* (2013.01)

(58) Field of Classification Search
None
See application file for complete search history.

(56) References Cited

U.S. PATENT DOCUMENTS

| 7,782,510 B2 | 8/2010 | Wilson et al. |
| 2005/0200927 A1* | 9/2005 | Brotherton-Ratcliffe et al. ............... 359/21 |
| 2006/0139710 A1 | 6/2006 | Schwerdtner |
| 2010/0073744 A1 | 3/2010 | Zschau |
| 2010/0149610 A1* | 6/2010 | Schwerdtner et al. ......... 359/32 |

FOREIGN PATENT DOCUMENTS

| JP | 2003-263094 | 9/2003 |
| JP | 2008-159200 | 7/2008 |
| JP | 2010-39069 | 2/2010 |
| KR | 10-2005-0040893 | 5/2005 |
| KR | 10-2007-0015628 | 2/2007 |
| KR | 10-0837365 | 6/2008 |
| KR | 10-2009-0088047 | 8/2009 |
| KR | 10-2010-0023865 | 3/2010 |
| KR | 10-0973031 | 7/2010 |
| KR | 10-2010-0111176 | 10/2010 |

OTHER PUBLICATIONS

James P. Waters, "Holographic Image Synthesis Utilizing Theoretical Methods", United Aircraft Research Laboratories, Oct. 14, 1966, pp. 405-407.

Alf Ritter et al., "Hardware-based Rendering of Full-Parallax Synthetic Holograms", Mar. 10, 1999, pp. 1364-1369.

Tsutomu Horikoshi et al., "Time-Sharing Display Approach Using Liquid Crystal Light Valve and a Photorefractive Crystal for Electroholography", Jan. 1999, pp. 64-71.

(Continued)

*Primary Examiner* — Jennifer L. Doak
(74) *Attorney, Agent, or Firm* — NSIP Law (57) ABSTRACT

A method and apparatus for fast generation of a hologram image. The method may include generating an elemental fringe pattern of a three-dimensional (3D) point included in a 3D spatial object, generating a point hologram based on the elemental fringe pattern, and generate a 3D hologram using a hologram pattern for each depth layer, generated using the point hologram.

27 Claims, 7 Drawing Sheets

(56) References Cited

OTHER PUBLICATIONS

Seung-Cheol Kim et al., "Effective Generation of Digital Holograms of Three-Dimensional Objects Using a Novel Look-Up Table Method", published Feb. 27, 2008, D55-D62.

Extended European Search Report issued Feb. 22, 2013, in corresponding European Patent Application No. 12190193.8.

\* cited by examiner

FIG. 7

METHOD AND APPARATUS FOR FAST GENERATION OF THREE-DIMENSIONAL (3D) HOLOGRAM

CROSS-REFERENCE TO RELATED APPLICATIONS

This application claims the priority benefit of Korean Patent Application No. 10-2011-0110993, filed on Oct. 28, 2011, in the Korean Intellectual Property Office, the disclosure of which is incorporated herein by reference.

BACKGROUND

1. Field

Example embodiments of the following description relate to a method and apparatus for generating a hologram pattern using an operation device, and more particularly, to a method and apparatus for generating a hologram pattern using an operation device by receiving an input of spatial object data or image data including a color and a depth.

2. Description of the Related Art

With the spread of a three-dimensional television (3D TV), an image providing a high 3D effect can be viewed at home. In this instance, a difficulty arises when an apparatus for reproducing a two-dimensional (2D) or 3D image using viewpoint information provides a realistic image identical to an actual object. For example, in a case of a stereo 3D image, the apparatus may have a limit in displaying a depth due to visual fatigue, and may have a difficulty in displaying a motion parallax, based on a movement of a user.

A hologram is technology for representing a 3D space that has a limitless number of viewpoints and causes little visual fatigue by reproducing a 3D spatial object using a strength and phase of light. Generally, a hologram is generated using a computer-generated hologram (CGH) using a method of generating a digital hologram. That is, in the digital hologram generating method, optical signals are approximated, and a hologram is generated using an interference pattern generated through a mathematical operation.

In the digital hologram generating method, a 3D spatial object is construed as a set of 3D points, and point holograms corresponding to all 3D points constituting the 3D spatial object are generated. In this instance, as the sophistication or complexity of the 3D spatial object increases, so too does a number of 3D points included in the 3D spatial object, and thus, an amount of calculation subsequently increases.

SUMMARY

The foregoing and/or other aspects are achieved by providing a method of generating a three-dimensional (3D) hologram, the method including generating an elemental fringe pattern of a 3D point included in a 3D spatial object, generating a point hologram based on the generated elemental fringe pattern, generating a hologram pattern using the generated point hologram, and generating a 3D hologram using the generated hologram pattern.

The generating of the elemental fringe pattern may include generating an elemental fringe pattern corresponding to each 3D point included in a depth layer of the 3D spatial object based on a distance from a hologram plane.

The generating of the elemental fringe pattern may include determining a reference pixel based on a central pixel positioned to correspond to the 3D point, among a plurality of pixels included in a hologram plane. The generating of the elemental fringe pattern may include generating an elemental fringe pattern including the reference pixel.

The generating of the point hologram may include generating the point hologram by duplicating a pattern of a reference region including pixels that may be interpolated using a reference pixel included in the elemental fringe pattern.

The generating of the elemental fringe pattern may include generating an elemental fringe pattern corresponding to at least one representative 3D point, among a plurality of 3D points included in a depth layer of the 3D spatial object based on a distance from a hologram plane.

The generating of the point hologram may include generating a representative point hologram based on the elemental fringe pattern corresponding to the at least one representative 3D point, and generating a point hologram of remaining 3D points, excluding the at least one representative 3D point, among the plurality of 3D points included in the depth layer by duplicating and shifting the representative point hologram.

The generating of the point hologram of the remaining 3D points may include generating the point hologram of the remaining 3D points based on a position of a central pixel corresponding to the at least one representative 3D point and a position of a central pixel, corresponding to the remaining 3D points, in the hologram plane.

The generating of the point hologram may include generating the point hologram using a look up table (LUT) in which a pixel value of a reference pixel included in the elemental fringe pattern is stored.

The generating of the point hologram may include generating the point hologram using an LUT in which a pixel value of a reference pixel included in the elemental fringe pattern is stored, and an LUT in which a radius value of a position of a pixel desired to be interpolated is stored.

The foregoing and/or other aspects are achieved by providing an apparatus for generating a 3D hologram, the apparatus including an elemental fringe pattern to generate an elemental fringe pattern of a 3D point included in a 3D spatial object, a point hologram generating unit to generate a point hologram based on the generated elemental fringe pattern, a hologram pattern generating unit to generate a hologram pattern using the generated point hologram, and a 3D hologram generating unit to generate a 3D hologram using the generated hologram pattern.

The elemental fringe pattern generating unit may generate an elemental fringe pattern corresponding to each 3D point included in a depth layer of the 3D spatial object based on a distance from a hologram plane.

The elemental fringe pattern generating unit may generate an elemental fringe pattern corresponding to at least one representative 3D point, among a plurality of 3D points included in a depth layer of the 3D spatial object based on a distance from a hologram plane.

In this instance, the point hologram generating unit may generate a representative point hologram based on the elemental fringe pattern corresponding to the at least one representative 3D point, and may generate a point hologram of remaining 3D points, excluding the at least one representative 3D point, among the plurality of 3D points included in the depth layer by duplicating and shifting the representative point hologram.

The point hologram generating unit may generate the point hologram using an LUT in which a pixel value of a reference pixel included in the elemental fringe pattern is stored.

The point hologram generating unit may generate the point hologram using an LUT in which a pixel value of a reference pixel included in the elemental fringe pattern is stored, and an LUT in which a radius value of a position of a pixel desired to be interpolated is stored.

The foregoing and/or other aspects are achieved by providing a method for fast generation of three-dimensional (3D) hologram, the method including storing, in a look up table (LUT), a pixel value of a reference pixel included in an elemental fringe pattern; generating a point hologram, using the LUT; and generating a hologram pattern, using the generated point hologram; and generating a 3D hologram, using the generated hologram pattern.

The example embodiments may include a method and apparatus that may generate elemental fringe patterns of some of a plurality of 3D points included in a 3D spatial object, and may generate a 3D hologram based on the generated elemental fringe patterns, thereby reducing an amount of calculation.

The example embodiments may also include a method and apparatus that may generate a point hologram using interpolation and pattern duplication based on an elemental fringe pattern, thereby allowing for fast generation of a 3D hologram while maintaining a quality of a restored hologram.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Reference will now be made in detail to embodiments, examples of which are illustrated in the accompanying drawings, wherein like reference numerals refer to the like elements throughout. Embodiments are described below to explain the present disclosure by referring to the figures.

Figure 1:
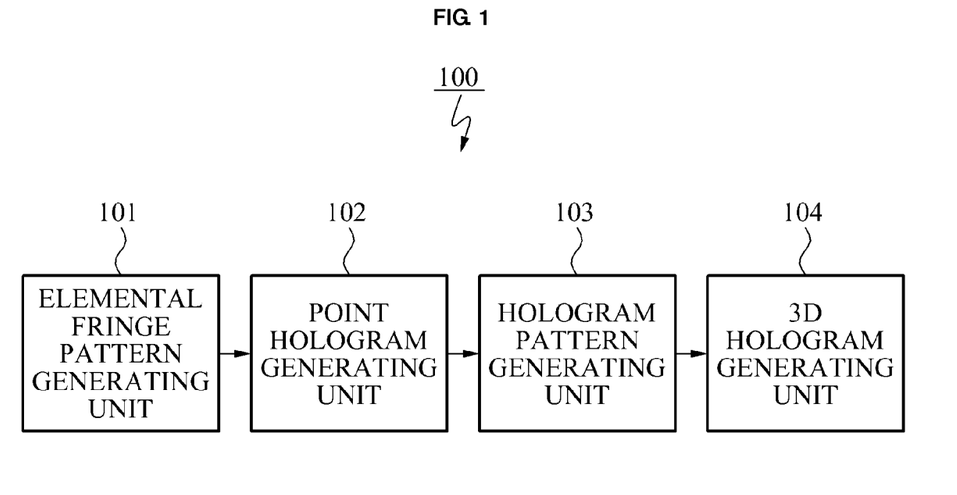
FIG. 1 illustrates a configuration of an apparatus for generating a three-dimensional (3D) hologram, according to example embodiments.

FIG. 1 is a block diagram illustrating a configuration of an apparatus 100 for generating a three-dimensional (3D) hologram, according to example embodiments.

Referring to FIG. 1, the apparatus 100 may include an elemental fringe pattern generating unit 101, a point hologram generating unit 102, a hologram pattern generating unit 103, and a 3D hologram generating unit 104.

The elemental fringe generating unit 101 may generate an elemental fringe pattern of a 3D point included in a 3D spatial object. In this case, the elemental fringe pattern may correspond to a pattern in a one-dimensional (1D) form, and may include a reference pixel used for generating a point hologram corresponding to a 3D point.

As an example, the elemental fringe pattern generating unit 101 may generate elemental fringe patterns corresponding to all 3D points included in the 3D spatial object.

As another example, the elemental fringe pattern generating unit 101 may determine at least one of 3D points included in the 3D spatial object to be a representative 3D point, and may generate an elemental fringe pattern corresponding to the representative 3D point.

In this instance, the elemental fringe pattern generating unit 101 may generate an elemental fringe pattern using the Rayleigh-Sommerfeld Equation, as expressed by Equation 1. The elemental fringe pattern generating unit 101 may generate the elemental fringe pattern based on a distance from a hologram plane to a 3D point.

$$O(\xi, \eta) = \frac{z}{j\lambda} \int\int_{-\infty}^{\infty} O(x, y) \frac{e^{jkd_{01}}}{d_{01}^2} \, dx\, dy, \qquad \text{[Equation 1]}$$

$$d_{01} = \sqrt{(\xi - x)^2 + (\eta - y)^2 + z^2},$$

where $O(\xi, \eta)$ denotes a light distribution for a pixel at coordinates $(\xi, \eta)$, among pixels included in the hologram plane. $O(x, y)$ denotes a light distribution for a 3D point at coordinates $(x, y)$, among 3D points included in the 3D spatial object. k denotes a wave number of a reference wave, and $$k = \frac{2\pi}{\lambda}.$$

$(\xi, \eta, z)$ denotes spatial coordinates of a pixel corresponding to a 3D point, among the plurality of pixels included in the hologram plane, and may correspond to information about spatial coordinates of each of the plurality of pixels included in a spatial light modulator (SLM). Here, $\tau$ denotes an abscissa of the pixel, $\eta$ denotes an ordinate of the pixel, and z denotes a depth value of the pixel. Similarly, $(x, y)$ denotes information about spatial coordinates of a 3D point, where x denotes an abscissa of the 3D point, and y denotes an ordinate of the 3D point. $d_{01}$ denotes a distance from the pixel at coordinates $(\xi, \eta, z)$ on the hologram plane to the 3D point at coordinates $(x, y)$. $e^{jkd_{01}}$ denotes a value of a phase that may have periodicity and symmetry based on the starting point of transformation coordinates.

In Equation 1, the hologram plane may correspond to a plane of an apparatus for displaying or reproducing a hologram, and may match a plurality of pixels included in the SLM. Accordingly, a plurality of pixels included in the hologram plane may refer to the plurality of pixels included in the SLM.

The point hologram generating unit 102 may generate a point hologram based on a reference pixel included in the elemental fringe pattern. Here, the reference pixel may refer to at least one pixel positioned in at least one of upper, lower, left, right, and diagonal directions based on a pixel at a position corresponding to a 3D point on the hologram plane. In this instance, the point hologram may correspond to a pattern in a 2D form, the pattern in which a single 3D point may be represented using a plurality of pixels included in the hologram plane.

For example, in a case of the diagonal direction, H pixels positioned in the diagonal direction based on a pixel at a position corresponding to the 3D point may be determined to be reference pixels. In this example, the point hologram generating unit 102 may generate a pixel value of a pixel to be interpolated, by performing an interpolation based on pixel values of the H reference pixels. For example, the point hologram generating unit 102 may generate the pixel value of the pixel to be interpolated, by performing a linear interpolation.

The point hologram generating unit 102 may generate a point hologram corresponding to the 3D point by duplicating a pattern of a reference region including pixels interpolated using the reference pixel.

In this instance, when the 3D spatial object includes M 3D points for each of N depth layers, the point hologram generating unit 102 may generate N×M point holograms based on N×M elemental fringe patterns.

When the 3D spatial object includes M 3D points for each of N depth layers, and a single representative 3D point is determined for each of the N depth layers, the point hologram generating unit 102 may generate a point hologram of a representative 3D point included in a first depth layer based on an elemental fringe pattern of the representative 3D point. The point hologram generating unit 102 may generate M−1 point holograms included in the first depth layer by duplicating and shifting the generated point hologram of the representative 3D point. In addition, the point hologram generating unit 102 may generate point holograms of 3D points included in other depth layers, that is, a second depth layer through an $N^{th}$ depth layer.

The hologram pattern generating unit 103 may generate a hologram pattern for each depth layer by accumulating point holograms corresponding to 3D points.

The 3D hologram generating unit 104 may generate a 3D hologram by performing a spatial light modulation on the hologram pattern generated for each depth layer.

Figure 2:
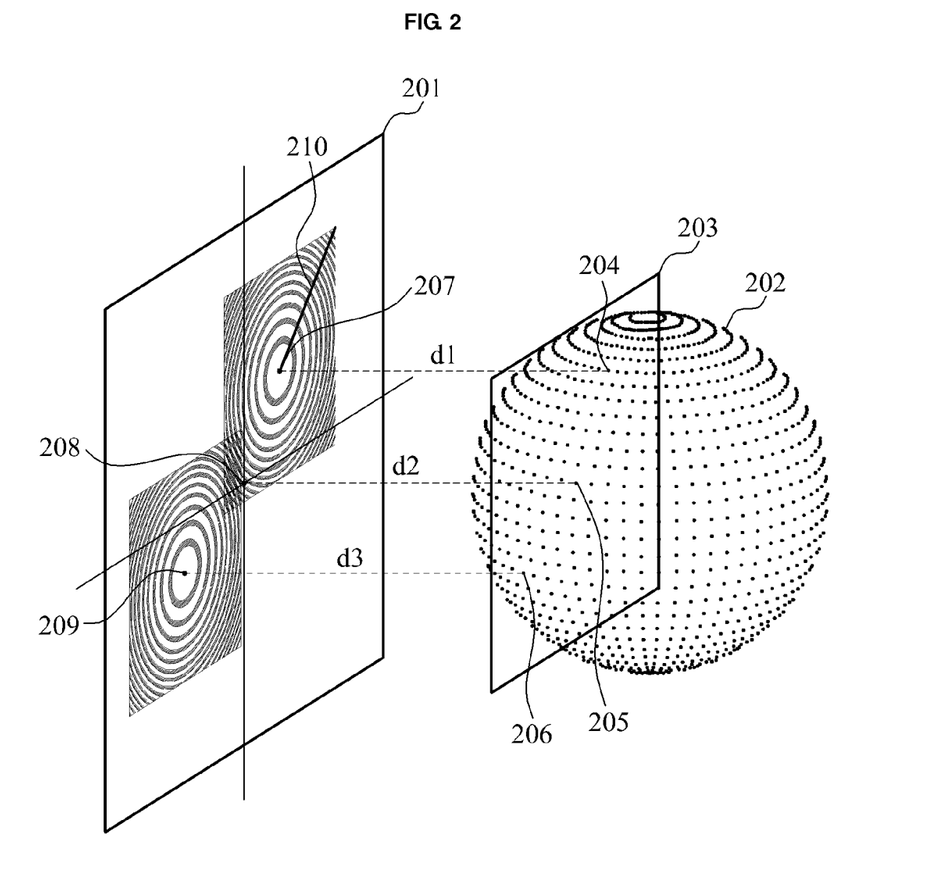
FIG. 2 illustrates an operation of generating an elemental fringe pattern in the apparatus of FIG. 1.

FIG. 2 is a diagram illustrating an operation of generating an elemental fringe pattern based on a distance from a hologram plane to a 3D point in the apparatus 100 of FIG. 1.

In FIG. 2, the elemental fringe pattern generating unit 101 may generate elemental fringe patterns corresponding to all 3D points included in a 3D spatial object, and may generate elemental fringe patterns corresponding to representative 3D points corresponding to some of the 3D points included in the 3D spatial object.

As an example, in order to generate elemental fringe patterns corresponding to all 3D points, the elemental fringe pattern generating unit 101 may generate an elemental fringe pattern corresponding to each 3D point included in a depth layer of a 3D spatial object 202, based on a distance between a 3D point and a hologram plane 201.

For example, elemental fringe patterns corresponding to all 3D points included in an identical depth layer 203 may be generated. In this case, the depth layer may refer to a layer including at least one 3D point that may be at an identical distance from the hologram plane 201, among 3D points included in the 3D spatial object 202. Referring to FIG. 2, a distance d1 between a first 3D point 204 and a central pixel 207 at a position where the first 3D point 204 may meet at right angles to the hologram plane 201, a distance d2 between a second 3D point 305 and a central pixel 208 at a position where the second 3D point 205 may meet at right angles to the hologram plane 201, and a distance d3 between a third 3D point 206 and a central pixel 209 at a position where the third 3D point 206 may meet at right angles to the hologram plane 201 may be identical. Accordingly, the first 3D point 204, the second 3D point 205, and the third 3D point 206 may be included in the identical depth layer 203.

The elemental fringe pattern generating unit 101 may generate elemental fringe patterns of the first 3D point 204, the second 3D point 205, and the third 3D point 206, respectively, using Equation 1. For example, a first elemental fringe pattern 210 corresponding to the first 3D point 204 may include pixels positioned in a diagonal direction, based on the central pixel 207 at a position corresponding to the first 3D point 204. In addition, the elemental fringe pattern generating unit 101 may generate a second elemental fringe pattern corresponding to the second 3D point 205, and may generate a third elemental fringe pattern corresponding to the third 3D point 206. Here, the pixels positioned in the diagonal direction may correspond to reference pixels. The reference pixels also may correspond to pixels positioned in upper, lower, left, and right directions based on the central pixel 207 at the position corresponding to the first 3D point 204. Thus, the elemental fringe pattern generating unit 101 may generate elemental fringe patterns by performing an operation according to Equation 1 on reference pixels positioned in a predetermined direction based on a central pixel at which a 3D point may meet at right angles to a hologram plane, thereby reducing an amount of calculation required for generating a hologram pattern.

The point hologram generating unit 102 may generate a first point hologram of the first 3D point 204 by performing an interpolation based on a pixel value of a reference pixel included in the first elemental fringe pattern 210 of the first 3D point 204. Additionally, the point hologram generating unit 102 may generate a second point hologram based on the second elemental fringe pattern of the second 3D point 205, and may generate a third point hologram based on the third elemental fringe pattern of the third 3D point 206. Thus, the point hologram generating unit 102 may generate point holograms of all 3D points included in an identical depth layer, for each depth layer.

As another example, the elemental fringe pattern generating unit 101 may generate an elemental fringe pattern corresponding to at least one representative 3D point, among a plurality of 3D points included in a depth layer of the 3D spatial object 202 based on a distance from the hologram plane 201. For example, when three 3D points 204, 205, and 206 are included in the identical depth layer 203, and the second 3D point 205 is determined to be a single representative 3D point, the elemental fringe pattern generating unit 101 may generate an elemental fringe pattern of the representative 3D point 205.

In this instance, among the three 3D points 204, 205, and 206 included in the identical depth layer 203, the elemental fringe pattern generating unit 101 may determine a 3D point corresponding to a central pixel that may be positioned in the center of a hologram plane, or may be closest to a pixel positioned in the center of the hologram plane to be the representative 3D point. For example, when the central pixel 208 at a position corresponding to the second 3D point 205 is positioned in the center of the hologram plane 201, the elemental fringe pattern generating unit 101 may determine the second 3D point 205 to be the representative 3D point. The elemental fringe pattern generating unit 101 may generate the second elemental fringe pattern of the second 3D point 205.

The point hologram generating unit 102 may generate the second point hologram of the second 3D point 205 by performing an interpolation based on a pixel value of a reference pixel included in the second elemental fringe pattern of the second 3D point 205. That is, the point hologram generating unit 102 may generate a representative point hologram based on the elemental fringe pattern of the representative 3D point. The point hologram generating unit 102 may generate point holograms of remaining 3D points included in the identical depth layer by duplicating and shifting the representative point hologram. That is, the point hologram generating unit 102 may generate a first point hologram of the first 3D point 204 by duplicating and shifting the representative point hologram, and may generate a third point hologram of the third 3D point 206 by duplicating and shifting the representative point hologram.

Figure 3:
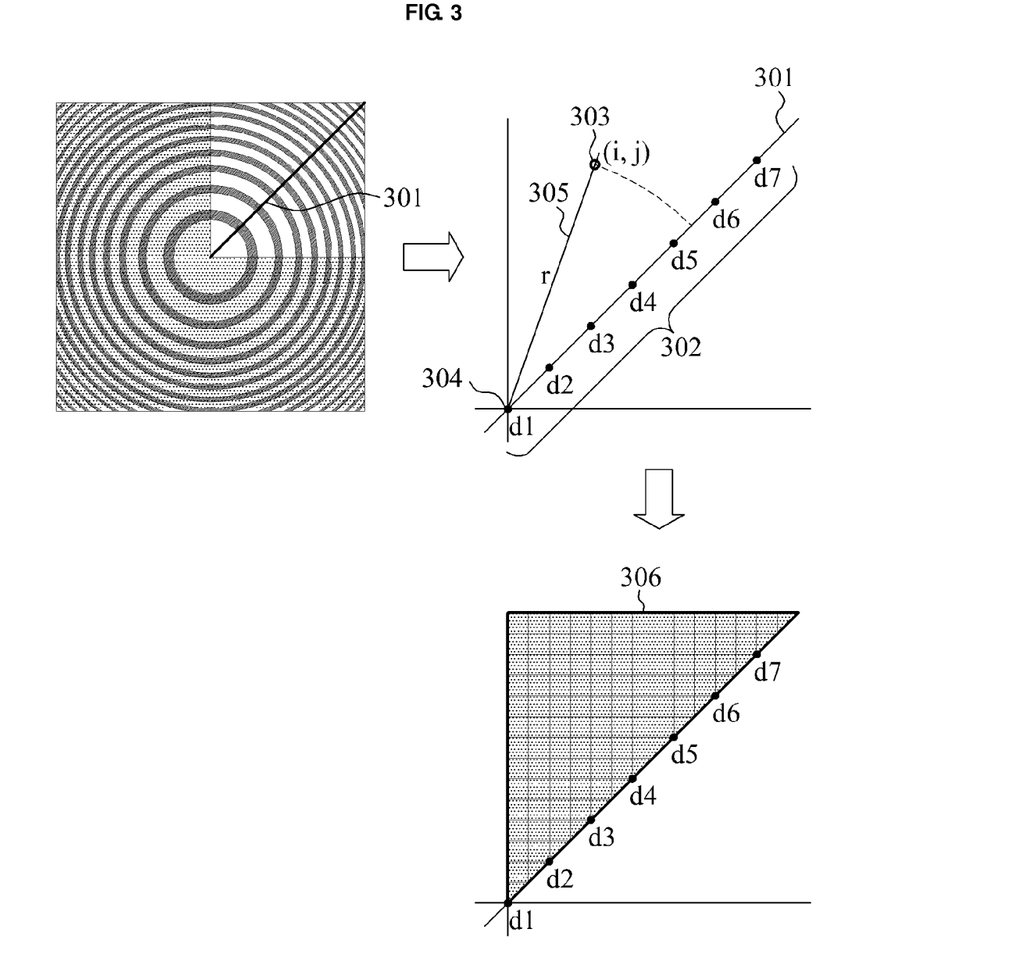
FIG. 3 illustrates an operation of interpolating a pixel value of a pixel to be interpolated in the apparatus of FIG. 1.

FIG. 3 is a diagram illustrating an operation of interpolating a pixel value of a pixel to be interpolated, using a reference pixel included in an elemental fringe pattern in the apparatus 100 of FIG. 1.

In FIG. 3, it may be assumed that the apparatus 100 may determine pixels positioned in a diagonal direction, based on a central pixel at a position corresponding to a 3D point, to be reference pixels, and may generate an elemental fringe pattern including the reference pixels. However, the determining of pixels positioned in a diagonal direction is provided as an embodiment and is not limited thereto. For example, the reference pixel may refer to at least one pixel positioned in at least one of upper, lower, left, right, and diagonal directions, based on a pixel at a position corresponding to a 3D point on the hologram.

Referring to FIG. 3, an elemental fringe pattern 301 may include pixels d1 through d7 302 that may be positioned in a diagonal direction based on a central pixel d1 304 at a position corresponding to a 3D point. In this instance, the point hologram generating unit 102 may generate pixel values of pixels included in a reference region based on pixel values of the reference pixels. Here, the reference region may refer to a region used for generating a point hologram using pattern duplication based on periodicity and symmetry of a point hologram, and may be predetermined to be a region on a left side or a right side based on an elemental fringe pattern.

For example, when the reference region is predetermined to be a region on a left side based on the elemental fringe pattern 301, in order to generate a pixel value of a pixel 303 to be interpolated, at coordinates (i, j) on a hologram plane, the point hologram generating unit 102 may calculate a distance r 305 from the pixel 303 to be interpolated to the central pixel 304, based on a position of the pixel 303 to be interpolated and a position of the central pixel 304. The point hologram generating unit 102 may determine a neighboring pixel adjacent to the pixel 303 to be interpolated, among the reference pixels d1 through d7 302, based on the distance r 305 and a distance from the central pixel 304 to each reference pixel. For example, the point hologram generating unit 102 may determine, to be neighboring pixels, the pixel d5 and the pixel d6 at distances from the central pixel 304 that may be closest to the distance r 305, among the reference pixels d1 through d7 302. The point hologram generating unit 102 may generate the pixel value of the pixel 303 to be interpolated by performing a linear interpolation based on a pixel value of the reference pixel d5 and a pixel value of the reference pixel d6. In addition, the point hologram generating unit 102 may generate pixel values of pixels to be interpolated included in a reference region 306 by performing an interpolation based on the pixel values of the reference pixels d1 through d7 302 included in the elemental fringe pattern 301. Here, the pixels to be interpolated may refer to pixels excluding reference pixels from pixels included in the reference region.

Figure 4:
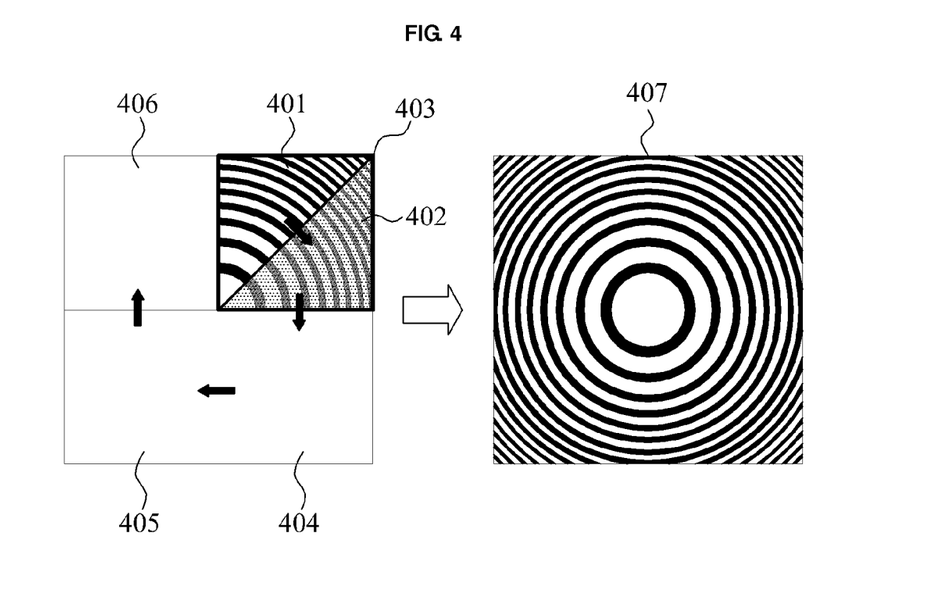
FIG. 4 illustrates an operation of generating a point hologram in the apparatus of FIG. 1.

FIG. 4 is a diagram illustrating an operation of generating a point hologram by duplicating a pattern of a reference region in the apparatus 100 of FIG. 1.

Referring to FIG. 4, the point hologram generating unit 102 may generate a pattern of a neighboring region 402 adjacent to a triangular-shaped reference region 401 by duplicating a pattern of the reference region 401. For example, the point hologram generating unit 102 may generate pixel values of pixels included in the neighboring region 402 by duplicating pixel values of pixels included in the reference region 401, based on symmetry between the reference region 401 and the neighboring region 402.

The point hologram generating unit 102 may generate a point hologram 407 corresponding to a 3D point by duplicating a pattern of a region 403 generated by combining the reference region 401 and the neighboring region 402. For example, the point hologram generating unit 102 may generate a pattern of a second quadrant 404 by duplicating a pattern of a first quadrant 403 based on symmetry between the patterns of the first quadrant 403 and the second quadrant 404. That is, the point hologram generating unit 102 may generate pixel values of pixels included in the second quadrant 404. Here, the pattern of the first quadrant 403 may correspond to the pattern of the region 403 generated by combining the reference region 401 and the neighboring region 402. In addition, the point hologram generating unit 102 may generate a pattern of a third quadrant 405 and a pattern of a fourth quadrant 406 by duplicating the pattern of the region 403 generated by combining the reference region 401 and the neighboring region 402.

In this instance, the point hologram generating unit 102 may generate the point hologram 407 by combining or merging at least one of the pattern of the reference region 401 and the patterns of the first quadrant 403 through the fourth quadrant 406.

Figure 5:
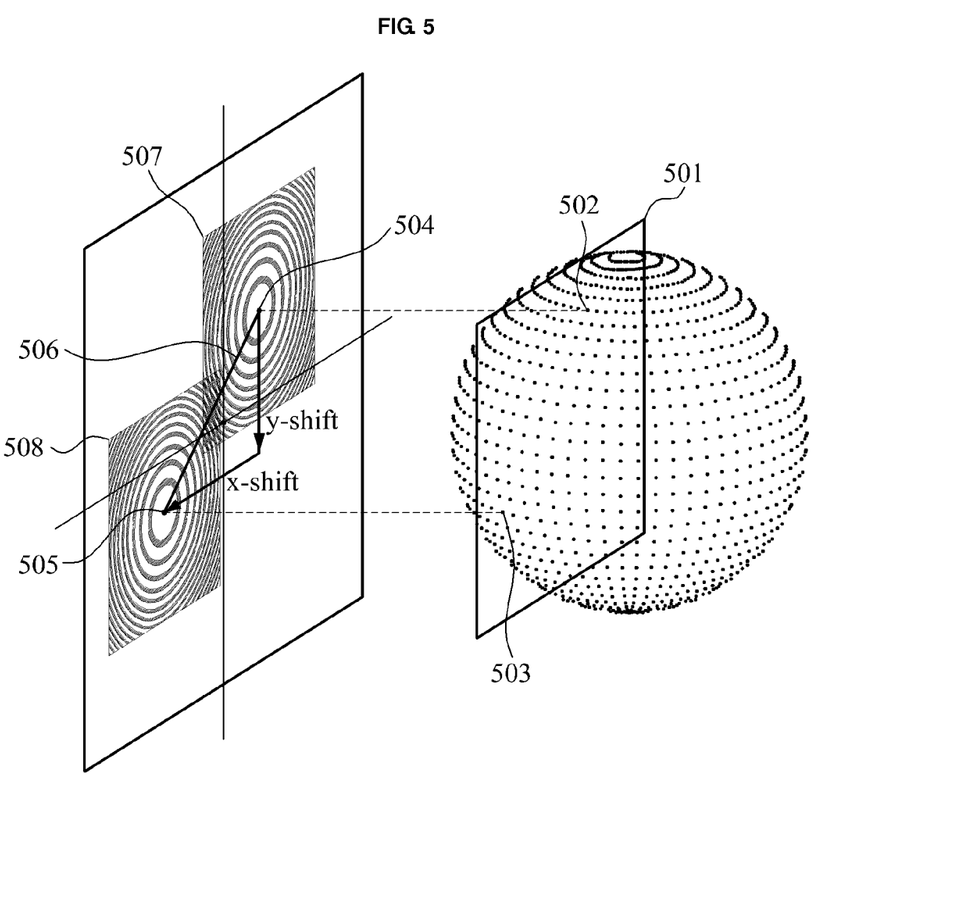
FIG. 5 illustrates an operation of generating a point hologram of each 3D point included in an identical depth layer in the apparatus of FIG. 1.

FIG. 5 is a diagram illustrating an operation of generating a point hologram of each 3D point included in an identical depth layer by duplicating and shifting a representative point hologram in the apparatus 100 of FIG. 1.

Referring to FIG. 5, the elemental fringe pattern generating unit 101 may determine at least one of 3D points included in a depth layer 501 of a 3D spatial object to be a representative 3D point. For example, when a first 3D point 502 is determined to be a representative 3D point, the elemental fringe pattern generating unit 101 may generate a first elemental fringe pattern corresponding to the first 3D point 502. The point hologram generating unit 102 may generate a first point hologram 507 as a representative point hologram, based on a reference pixel included in the first elemental fringe pattern.

The point hologram generating unit 102 may generate point holograms corresponding to remaining 3D points included in the depth layer 501 by duplicating and shifting the representative point hologram. Here, the remaining 3D points may refer to 3D points excluding the representative point from the 3D points included in the identical depth layer in which the representative 3D point may be included.

In this instance, the point hologram generating unit 102 may duplicate and shift the representative point hologram based on a position of a central pixel 504 corresponding to the representative 3D point 502, and a position of a central pixel corresponding to a target 3D point. Here, the target 3D point may refer to a 3D point for which a point hologram is desired to be generated, among the 3D points included in the identical depth layer in which the representative 3D point may be included. For example, when M 3D points are included in the depth layer 501, in order to generate a second point hologram of a second 3D point 503, the point hologram generating unit 102 may calculate a pixel distance 506 from the central pixel 504 corresponding to the representative 3D point 502 to a central pixel 505 corresponding to the second 3D point 503, based on a position of the central pixel 504 corresponding to the representative 3D point 502 and a position of the central pixel 505 corresponding to the second 3D point 503. The point hologram generating unit 102 may generate a second point hologram 508 by duplicating and shifting the representative point hologram 507 in a direction of an x-axis and a direction of a y-axis, based on the position of the central pixel 505 corresponding to the second 3D point 503, and the pixel distance 506. Additionally, the point hologram generating unit 102 may generate point holograms corresponding to other 3D points, that is, a third 3D point through an $M^{th}$ 3D point, included in the depth layer 501.

The point hologram generating unit 102 may generate a representative point hologram for each depth layer, and may generate point holograms corresponding to remaining 3D points included in each depth layer by duplicating and shifting the representative point hologram.

The hologram pattern generating unit 103 may generate a hologram pattern by accumulating the point holograms for each depth layer. For example, when N depth layers are provided, and M 3D points are included in each depth layer, the hologram pattern generating unit 103 may generate a first hologram pattern by accumulating M point holograms corresponding to 3D points included in a first depth layer. Further, the hologram pattern generating unit 103 may generate hologram patterns, that is, a second hologram pattern through an $N^{th}$ hologram pattern.

The 3D hologram generating unit 104 may generate a 3D hologram by performing a spatial light modulation on the hologram patterns, that is, the first hologram pattern through the $N^{th}$ hologram pattern.

Figure 6:
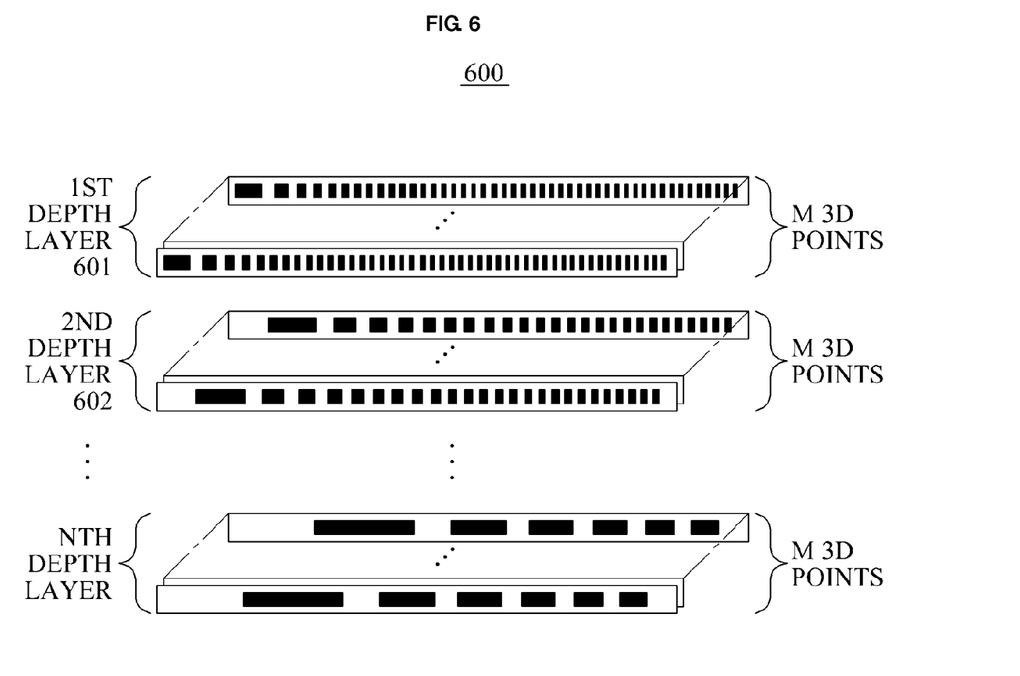
FIG. 6 illustrates an operation of generating a point hologram using a look up table (LUT) in which a pixel value of a reference pixel included in an elemental fringe pattern may be stored in the apparatus of FIG. 1.

FIG. 6 is a diagram illustrating an operation of generating a point hologram using a look up table (LUT) in which a pixel value of a reference pixel included in an elemental fringe pattern may be stored, in the apparatus 100 of FIG. 1.

Referring to FIG. 6, an LUT may pre-store, for each depth layer, pixel values of reference pixels positioned in upper, lower, left, right, and diagonal directions based on a central pixel corresponding to a 3D point. For example, referring to FIG. 3, the pixel values of the reference pixels d1 through d7 302 may be pre-stored in an LUT. The point hologram generating unit 102 may generate a pixel value of a pixel to be interpolated, included in a reference region, by performing an interpolation based on the pixel values of the reference pixels. The point hologram generating unit 102 may generate point holograms of 3D points included in a depth layer by duplicating a pattern of the reference region.

As an example, when N depth layers are provided, and M 3D points are included in each depth layer, an LUT 600 may pre-store pixel values of reference pixels for M 3D points included in a first depth layer 601, pixel values of reference pixels for M 3D points included in a second depth layer 602, and pixel values of reference pixels for M 3D points included in an $N^{th}$ depth layer. That is, the LUT may pre-store, for each depth layer, pixel values of reference pixels for all 3D points included in each depth layer.

As another example, an LUT may pre-store, for each depth layer, pixel values of reference pixels positioned in upper, lower, left, right, and diagonal directions based on a central pixel corresponding to a representative 3D point. That is, the LUT may pre-store pixel values of reference pixels only, included in an elemental fringe pattern of the representative 3D point.

When the LUT pre-stores only the pixel values of the reference pixels for the representative 3D point, the point hologram generating unit 102 may generate a representative point hologram using the pixel values of the reference pixels for the representative 3D point, and may generate point holograms of remaining 3D points included in an identical depth layer in which the representative 3D point may be included, by duplicating and shifting the representative point hologram.

As described with reference to FIG. 6, the apparatus 100 may generate point holograms using an LUT, thereby reducing an amount of time expended and an amount of calculation performed in calculating an elemental fringe pattern. Accordingly, when an LUT is used, the apparatus 100 may omit an operation of generating the elemental fringe pattern.

Figure 7:
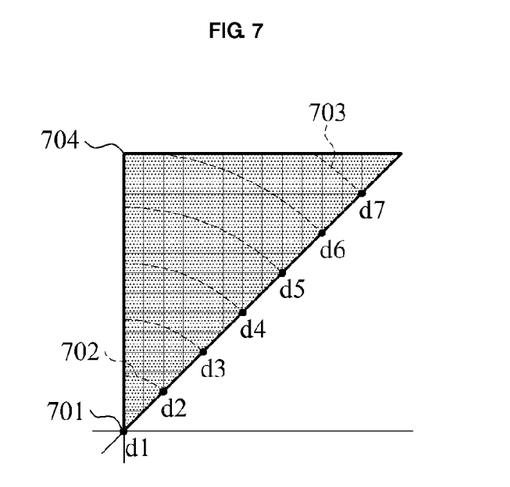
FIG. 7 illustrates an operation of generating a point hologram using an LUT in which a pixel value of a reference pixel and a pixel value of a pixel to be interpolated may be stored, in the apparatus of FIG. 1.

FIG. 7 is a diagram illustrating an operation of generating a point hologram using an LUT in which a pixel value of a reference pixel and a pixel value of a pixel to be interpolated may be stored in the apparatus 100 of FIG. 1.

Referring to FIG. 7, an LUT may pre-store a pixel value of a reference pixel included in an elemental fringe pattern, and a radius value of a position of a pixel desired to be interpolated. For example, among pixels included in a reference region 704, an LUT may pre-store a radius value of a position of a pixel 702 to be interpolated that may be positioned at a radius equal to a distance from a central pixel 701 to a reference pixel d2, and a radius value of a position of a pixel 703 to be interpolated that may be positioned at a radius equal to a distance from the central pixel 701 to a reference pixel d7.

When the LUT pre-stores the pixel value of the reference pixel and the radius value of the position of the pixel to be interpolated, an amount of calculation performed in generating a point hologram may be reduced, and a point hologram with an improved quality may be generated when compared to a case of generating a point hologram using the pixel value of the reference pixel only.

The pixel value of the reference pixel and the radius value of the position of the pixel to be interpolated may be stored separately in different LUTs, or may be stored together in a single LUT.

Figure 8:
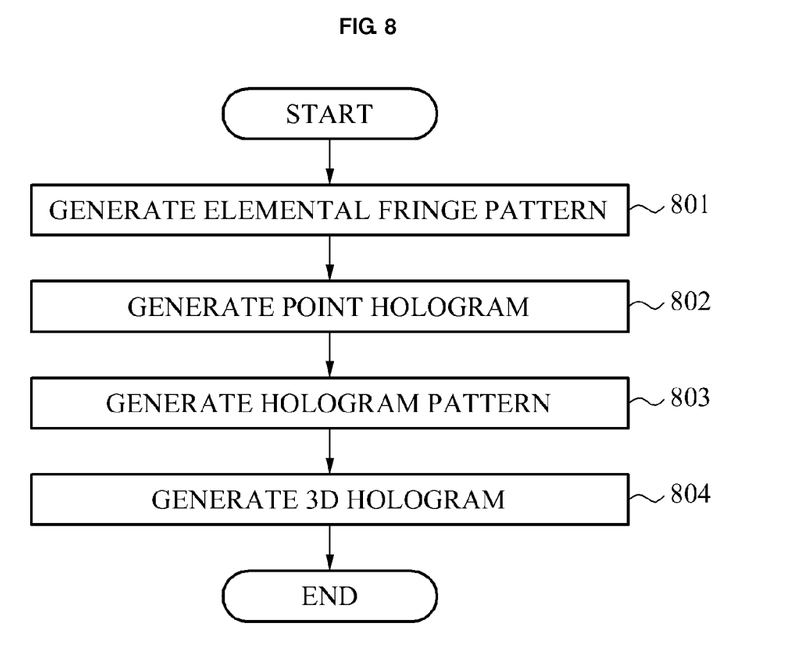
FIG. 8 illustrates a process of generating a 3D hologram in the apparatus of FIG. 1.

FIG. 8 is a flowchart illustrating a process of generating a 3D hologram in the apparatus 100 of FIG. 1.

In operation 801, the apparatus 100 may generate an elemental fringe pattern of a 3D point included in a 3D spatial object. Here, the elemental fringe pattern may correspond to a pattern in a 1D form, and may include a reference pixel used for generating a point hologram corresponding to a 3D point.

As an example, the apparatus 100 may generate elemental fringe patterns corresponding to all 3D points included in a depth layer of the 3D spatial object based on a distance from a hologram plane. Here, the depth layer may refer to a layer including 3D points that may be at an identical distance from the hologram plane, among the 3D points included in the 3D spatial object. For example, when M 3D points are included in a first depth layer, the apparatus 100 may determine, to be reference pixels, pixels positioned in a predetermined direction based on a central pixel at a position corresponding to a first 3D point, and may generate a first elemental fringe pattern including the reference pixels. Further, the apparatus 100 may generate elemental fringe patterns of all 3D points included in the first depth layer by generating elemental fringe patterns, that is, a second elemental fringe pattern through an $M^{th}$ elemental fringe pattern. In this case, as a non-limiting example, the predetermined direction may be predetermined to be at least one of upper, lower, left, right, and diagonal directions based on the central pixel. Thus, the apparatus 100 may generate elemental fringe patterns for all depth layers of the 3D spatial object.

As another example, the apparatus 100 may generate an elemental fringe pattern corresponding to a representative 3D point, among a plurality of 3D points included in a depth layer of the 3D spatial object based on a distance from a hologram plane. Here, the representative 3D point may correspond to at least one of the 3D points included in an identical depth layer. For example, among 3D points included in an identical depth layer, the apparatus 100 may determine a 3D point corresponding to a central pixel that may be positioned in the center of a hologram plane, or may be closest to a pixel positioned in the center of the hologram plane to be the representative 3D point.

In operation 802, the apparatus 100 may generate a point hologram based on the elemental fringe pattern.

As an example, in order to generate a point hologram using elemental fringe patterns of all 3D points included in a depth layer, the apparatus 100 may generate a pixel value of a pixel to be interpolated, included in a reference region, using reference pixels included in the elemental fringe patterns. For example, the apparatus 100 may generate the pixel value of the pixel to be interpolated by performing a linear interpolation based on pixel values of the reference pixels. Here, the reference region may refer to a region used for generating a point hologram using pattern duplication based on periodicity and symmetry of a point hologram, and may be predetermined to be a region on a left side or a right side based on an elemental fringe pattern. The apparatus 100 may generate a point hologram corresponding to a 3D point by performing an interpolation, and duplicating a pattern of the reference region.

As another example, in order to generate point holograms of all 3D points included in a depth layer using a representative point hologram, the apparatus 100 may generate a pixel value of a pixel to be interpolated, included in a reference region, by performing an interpolation based on a pixel value of a reference pixel included in an elemental fringe pattern of a representative 3D point. The apparatus 100 may generate a representative point hologram by duplicating a pattern of the reference region.

The apparatus 100 may generate a point hologram corresponding to a target 3D point by duplicating and shifting the representative point hologram based on a pixel distance. Here, the pixel distance may refer to a distance between a position of a central pixel corresponding to the representative 3D point and a position of a central pixel corresponding to the second 3D point 503 of FIG. 5. Moreover, the target 3D point may refer to a 3D point for which a point hologram is desired to be generated, among 3D points included in an identical depth layer in which the representative 3D point may be included. For example, the target 3D point may correspond to a remaining 3D point, excluding the representative 3D point from the 3D points included in the identical depth layer in which the representative 3D point may be included.

The apparatus 100 may generate only a representative point hologram for each depth layer, and may generate point holograms corresponding to all 3D points included in each depth layer by duplicating and shifting the representative point hologram.

In operation 803, the apparatus 100 may generate a hologram pattern for each depth layer by accumulating point holograms corresponding to all 3D points included in a depth layer. For example, when N depth layers are provided, the apparatus 100 may generate N hologram patterns.

In operation 804, the apparatus 100 may generate a 3D hologram by performing a spatial light modulation on a hologram pattern for each depth layer.

In FIG. 8, although it has been described that the apparatus 100 may generate a point hologram corresponding to a 3D point using an elemental fringe pattern, it has been provided as an embodiment and is not limited thereto. The apparatus 100 may generate a point hologram using an LUT.

As an example, the LUT may pre-store pixel values of reference pixels included in elemental fringe patterns of all 3D points included in a depth layer.

As another example, the LUT may pre-store only a pixel value of a reference pixel included in an elemental fringe pattern of a representative 3D point included in each depth layer.

As still another example, the LUT may pre-store a pixel value of a reference pixel included in an elemental fringe pattern, and a radius value of a position of a pixel desired to be interpolated.

As yet another example, the LUT may pre-store pixel values of all pixels included in a reference region.

Accordingly, when the LUT is used, the apparatus 100 may omit an operation of generating an elemental fringe pattern, and may generate a point hologram directly, thereby reducing an amount of calculation and an amount of time expended in the calculation.

The methods according to the above-described embodiments may be recorded in non-transitory computer-readable media including program instructions to implement various operations embodied by a computer. The media may also include, alone or in combination with the program instructions, data files, data structures, and the like. Examples of program instructions include both machine code, such as produced by a compiler, and files containing higher level code that may be executed by the computer using an interpreter. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Further, according to an aspect of the embodiments, any combinations of the described features, functions and/or operations can be provided.

Moreover, the apparatus for generating a 3D hologram may include at least one processor to execute at least one of the above-described units and methods.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. A method of generating a three-dimensional (3D) hologram, the method comprising:

generating an elemental fringe pattern for generating another fringe pattern included in the 3D hologram for a pixel in a hologram plane, the pixel corresponding to a 3D point included in a predetermined one of a plurality of depth layers of a 3D spatial object, and the plurality of depth layers being selectively defined to include 3D points of the 3D spatial object according to a distance of the 3D points from the hologram plane;

generating a first point hologram, by performing an interpolation based on a pixel value of a reference pixel included in the generated elemental fringe pattern, and a second point hologram within the predetermined depth layer by repeatedly duplicating the first point hologram;
generating a hologram pattern, using the generated point holograms for each depth layer; and
generating the 3D hologram by performing a spatial light modulation on the generated hologram pattern.

2. The method of claim 1, wherein the generating of the elemental fringe pattern comprises generating an elemental fringe pattern corresponding to each 3D point included in a corresponding depth layer of the 3D spatial object, based on a distance from a hologram plane.

3. The method of claim 1, wherein the generating of the elemental fringe pattern comprises determining the reference pixel, based on a central pixel positioned corresponding to the 3D point, among a plurality of pixels included in a hologram plane, and generating an elemental fringe pattern including the reference pixel.

4. The method of claim 1, wherein the generating of the point hologram comprises generating the point hologram by duplicating a pattern of a reference region including pixels that are interpolated, using a reference pixel included in the elemental fringe pattern.

5. The method of claim 1, wherein the generating of the elemental fringe pattern comprises generating an elemental fringe pattern corresponding to at least one representative 3D point, among a plurality of 3D points included in a depth layer of the 3D spatial object, based on a distance from a hologram plane.

6. The method of claim 5, wherein the generating of the point hologram comprises:
generating a representative point hologram, based on the elemental fringe pattern corresponding to the at least one representative 3D point; and
generating a point hologram of remaining 3D points, excluding the at least one representative 3D point, among the plurality of 3D points included in the depth layer by duplicating and shifting the representative point hologram.

7. The method of claim 6, wherein the generating of the point hologram of the remaining 3D points comprises generating the point hologram of the remaining 3D points, based on a position of a central pixel corresponding to the at least one representative 3D point and a position of a central pixel corresponding to the remaining 3D points, the central pixels being in the hologram plane.

8. The method of claim 1, wherein the generating of the point hologram comprises generating the point hologram using a look up table (LUT) in which a pixel value of a reference pixel included in the elemental fringe pattern is stored.

9. The method of claim 1, wherein the generating of the point hologram comprises generating the point hologram using an LUT in which a pixel value of a reference pixel included in the elemental fringe pattern is stored, and an LUT in which a radius value of a position of a pixel desired to be interpolated is stored.

10. The method of claim 1, wherein
the generating of the hologram pattern comprises generating the hologram pattern for each depth layer by accumulating point holograms corresponding to 3D points included in a depth layer, and
the generating of the 3D hologram comprises generating the 3D hologram by performing a spatial light modulation on the hologram pattern generated for each depth layer.

11. The method of claim 3, wherein the reference pixel refers to at least one pixel positioned in at least one of upper, lower, left, right, and diagonal directions, based on the central pixel on the hologram plane.

12. An apparatus for generating a three-dimensional (3D) hologram, the apparatus comprising:
an elemental fringe pattern generating unit configured to generate an elemental fringe pattern for generating another fringe pattern included in the 3D hologram for a pixel in a hologram plane, the pixel corresponding to a 3D point included in a predetermined one of a plurality of depth layers of the 3D spatial object, and the plurality of depth layers being selectively defined to include 3D points of the spatial object according to a distance of the 3D points from the hologram plane;
a point hologram generating unit configured to generate a first point hologram, by performing an interpolation based on a pixel value of a reference pixel included in the generated elemental fringe pattern and a second point hologram within the predetermined depth layer by repeatedly duplicating the first point hologram;
a hologram pattern generating unit configured to generate a hologram pattern, using the generated point holograms for each depth layer; and
a 3D hologram generating unit configured to generate the 3D hologram, by performing a spatial light modulation on the generated hologram pattern.

13. The apparatus of claim 12, wherein the elemental fringe pattern generating unit generates an elemental fringe pattern corresponding to each 3D point included in a depth layer of the 3D spatial object based on a distance from a hologram plane.

14. The apparatus of claim 12, wherein the elemental fringe pattern generating unit determines the reference pixel, based on a central pixel positioned corresponding to the 3D point, among a plurality of pixels included in a hologram plane, and generates an elemental fringe pattern including the reference pixel.

15. The apparatus of claim 12, wherein the point hologram generating unit generates the point hologram by duplicating a pattern of a reference region including pixels that are interpolated using a reference pixel included in the elemental fringe pattern.

16. The apparatus of claim 12, wherein the elemental fringe pattern generating unit generates an elemental fringe pattern corresponding to at least one representative 3D point, among a plurality of 3D points included in a depth layer of the 3D spatial object, based on a distance from a hologram plane.

17. The apparatus of claim 16, wherein the point hologram generating unit generates a representative point hologram, based on the elemental fringe pattern corresponding to the at least one representative 3D point, and generates a point hologram of remaining 3D points, excluding the at least one representative 3D point, among the plurality of 3D points included in the depth layer by duplicating and shifting the representative point hologram.

18. The apparatus of claim 17, wherein the point hologram generating unit generates the point hologram of the remaining 3D points, based on a position of a central pixel corresponding to the at least one representative 3D point and a position of a central pixel corresponding to the remaining 3D points, the central pixels being in the hologram plane.

19. The apparatus of claim 12, wherein the point hologram generating unit generates the point hologram using a look up table (LUT) in which a pixel value of a reference pixel included in the elemental fringe pattern is stored.

20. The apparatus of claim 12, wherein the point hologram generating unit generates the point hologram using an LUT in which a pixel value of a reference pixel included in the elemental fringe pattern is stored, and an LUT in which a radius value of a position of a pixel desired to be interpolated is stored.

21. The apparatus of claim 12, wherein
the hologram pattern generating unit generates the hologram pattern for each depth layer by accumulating point holograms corresponding to 3D points included in a depth layer, and
the 3D hologram generating unit generates the 3D hologram by performing a spatial light modulation on the hologram pattern generated for each depth layer.

22. A non-transitory computer-readable medium comprising a program for instructing a computer to perform the method of claim 1.

23. A method for fast generation of three-dimensional (3D) hologram, the method comprising:
storing, in a look up table (LUT), a pixel value of a reference pixel included in an elemental fringe pattern, the elemental fringe pattern extending from an initial pixel thereof in a hologram plane for generating another fringe pattern included in the 3D hologram, the initial pixel corresponding to a 3D point included in a predetermined one of a plurality of depth layers of a 3D spatial object, and the plurality of depth layers being selectively defined to include 3D points of the 3D spatial object according to a distance of the 3D points from the hologram plane;
generating a first point hologram, using the LUT, and a second point hologram within the predetermined depth layer of the 3D spatial object by repeatedly duplicating the first point hologram; and
generating a hologram pattern, using the generated point holograms for each depth layer; and
generating the 3D hologram, by performing a spatial light modulation on the generated hologram pattern.

24. The method of claim 23, wherein the LUT stores a radius value of a position of a pixel to be interpolated.

25. The apparatus of claim 12, wherein the 3D hologram generating unit includes a spatial light modulator (SLM).

26. The method of claim 6, wherein the representative 3D point is established based upon a proximity to a central portion of the hologram plane relative to the remaining 3D points.

27. The method of claim 1, wherein the generating of the first point hologram comprises rendering a bitmapped triangle according to the elemental fringe pattern;
mirroring the bitmapped triangle across a hypotenuse thereof to define a first quadrant of the first point hologram; and,
transforming the first quadrant to establish remaining quadrants of the first point hologram.

* * * * *